(12) United States Patent
Linzer et al.

(10) Patent No.: US 8,023,013 B1
(45) Date of Patent: Sep. 20, 2011

(54) FIXED PATTERN NOISE CORRECTION WITH COMPRESSED GAIN AND OFFSET

(75) Inventors: Elliot N. Linzer, Suffern, NY (US); Leslie D. Kohn, Fremont, CA (US)

(73) Assignee: Ambarella, Inc., Santa Clara, CA (US)

( * ) Notice: Subject to any disclaimer, the term of this patent is extended or adjusted under 35 U.S.C. 154(b) by 777 days.

(21) Appl. No.: 11/692,580

(22) Filed: Mar. 28, 2007

(51) Int. Cl.
*H04N 9/64* (2006.01)
*H04N 5/228* (2006.01)
*H04N 5/217* (2011.01)

(52) U.S. Cl. ............... 348/247; 348/222.1; 348/241; 348/246

(58) Field of Classification Search ............... 348/222.1, 348/141–251
See application file for complete search history.

(56) References Cited

U.S. PATENT DOCUMENTS

| | | | |
|---|---|---|---|
| 4,920,428 A * | 4/1990 | Lin et al. | 358/461 |
| 6,267,501 B1 | 7/2001 | Wand et al. | 374/124 |
| 6,995,346 B2 * | 2/2006 | Johanneson et al. | 250/208.1 |
| 7,317,481 B2 | 1/2008 | Harada et al. | 348/243 |
| 7,443,431 B2 | 10/2008 | Kelly et al. | 348/244 |
| 7,667,766 B2 | 2/2010 | Lee et al. | 348/370 |
| 7,812,867 B2 | 10/2010 | Okado | 348/247 |
| 2004/0239782 A1 * | 12/2004 | Equitz et al. | 348/246 |

* cited by examiner

*Primary Examiner* — Sinh Tran
*Assistant Examiner* — Mark Monk
(74) *Attorney, Agent, or Firm* — Christopher P. Maiorana, PC (57) ABSTRACT

A method of pixel correction is disclosed. The method generally includes the steps of (A) calibrating a per-pixel correction model of a sensor at a plurality of different illumination levels, (B) generating a plurality of pixel values from the sensor in response to an optical signal and (C) generating a plurality of corrected values by applying the per-pixel correction model to the pixel values.

21 Claims, 11 Drawing Sheets

FIXED PATTERN NOISE CORRECTION WITH COMPRESSED GAIN AND OFFSET

The present application is related to co-pending application Ser. No. 11/692,513 filed Mar. 28, 2007 and Ser. No. 11/692,733 filed Mar. 28, 2007, which are hereby incorporated by referenced in their entirety.

FIELD OF THE INVENTION

The present invention relates to a method and/or architecture for digital photography generally and, more particularly, to fixed pattern noise correction with compressed gain and offset.

BACKGROUND OF THE INVENTION

An electronic sensor (CCD or CMOS) is commonly used in digital still and video cameras for converting an optical signal into a digital representation of the image in the optical signal. The digital image, as measured at each pixel, is not exactly proportional to the amount of light incident on the sensor as a variety of factors contribute noise to the measured value. The sensor noise can be broken down into two components, a fixed pattern noise (FPN) and non-fixed noise.

Fixed pattern noise is noise that depends on the pixel location (spatial dependency) as well as the amount of light incident on the pixel (signal dependency). The noise is substantially invariant over short periods (i.e., almost unchanged over a few seconds). Fixed pattern noise is commonly a function of temperature and so will change as the sensor heats up or cools down. Furthermore, fixed pattern noise changes very slowly as the sensor ages (i.e., over months or years).

Non-fixed noise is noise that has no statistical dependence from picture to picture. The noise is naturally created within the sensor and associated analog electronics. Stray background light and radiation also contribute to the non-fixed noise.

Black frame subtraction is a conventional technique used to cancel fixed pattern noise. The black frame subtraction technique captures a picture with the camera shutter closed. Since no optical signal is incident on the sensor while the shutter is closed, a resulting black frame records only noise. The black frame is then subtracted from future pictures to cancel the fixed pattern noise.

Figure 1:
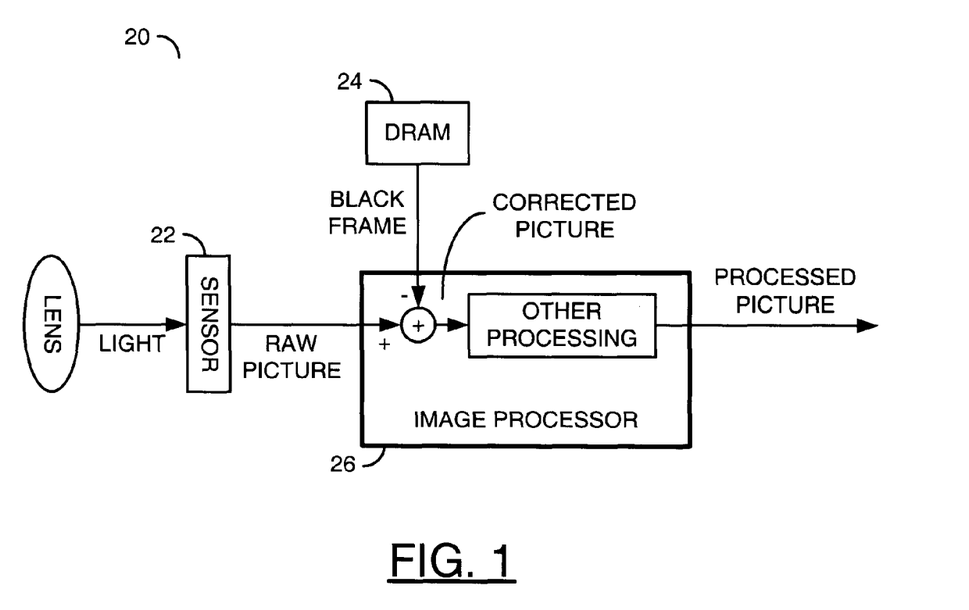
FIG. 1 is a diagram of a conventional device that uses black-frame subtraction.

Referring to FIG. 1, a diagram of a conventional device 20 that uses black-frame subtraction is shown. Light incident on a sensor 22 is converted into a raw picture signal. A black frame stored in a memory 24 is subtracted from the raw picture signal by an image processor 26. After further conventional processing, a processed picture signal is presented by the image processor 26.

Conventional black frame subtraction techniques have several drawbacks. For example, black frame subtraction can only eliminate signal independent (additive) fixed pattern noise because the black frame only measures noise when no light is incident on the sensor. The black frame subtraction techniques cannot reduce signal dependent noise. Furthermore, the black frame itself is typically large. For example, an 8 million pixel sensor using 12 bits/pixel creates a 12 megabyte black frame. Therefore, storing the black frame is usually expensive. The storage is typically implemented in a large, high-bandwidth memory. The bandwidth criterion is particularly high for high-speed high-resolution still cameras and video cameras (typically processing 60 pictures/second). Furthermore, the time used to compute the black frame (i.e., capture and process the black frame) reduces the usability of the camera. The black-frame capture can take the form of increased start-up time if done when the camera is first powered up or increased picture-to-picture time if done after the picture is taken. If the black-frame capture is done when the camera is first powered up, the sensor will typically be cool, but as the camera is used the sensor will heat up thus changing the noise pattern. Fixed pattern noise models and bad pixel masks measured at low temperatures may be quite inaccurate if used at high temperatures.

SUMMARY OF THE INVENTION

The present invention concerns a method of pixel correction. The method generally comprises the steps of (A) calibrating a per-pixel correction model of a sensor at a plurality of different illumination levels, (B) generating a plurality of pixel values from the sensor in response to an optical signal and (C) generating a plurality of corrected values by applying the per-pixel correction model to the pixel values.

The objects, features and advantages of the present invention include providing a method and/or architecture for fixed pattern noise correction with compressed gain and offset that may (i) correct for fixed pattern noise as a function of illumination levels, (ii) correct for fixed pattern noise and bad pixels as a function of temperature, (iii) reduce a size of a fixed pattern noise model, (iv) reduce a bandwidth to a memory device storing the correction noise information compared with conventional techniques, (v) calibrate a sensor during a power down routine, (vi) avoid camera startup delays due to calibration and/or (vii) avoid delays between the button press and picture capture due to calibration.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Figure 2:
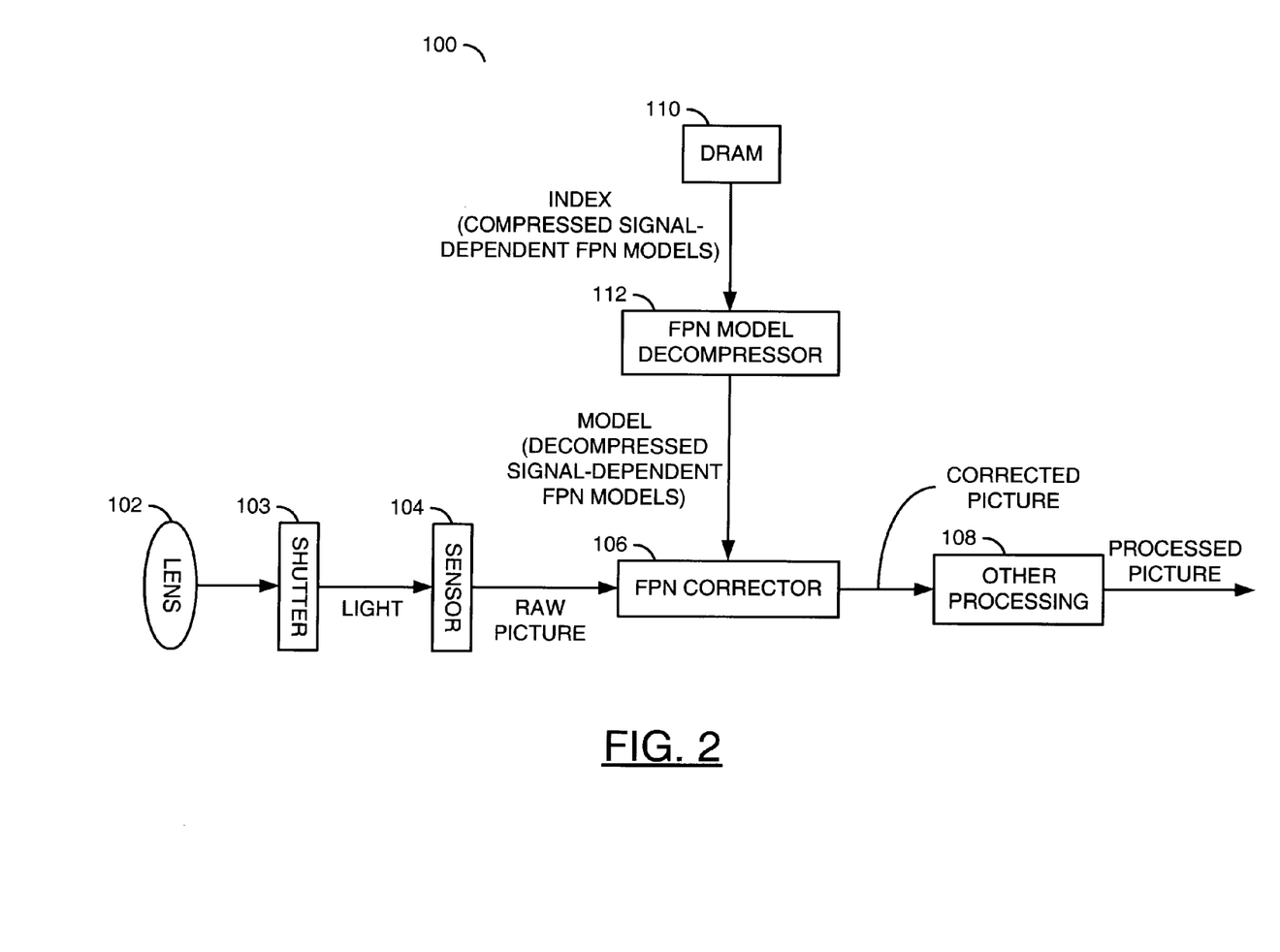
FIG. 2 is a block diagram of a first example implementation of a device in accordance with a preferred embodiment of the present invention.

Referring to FIG. 2, a block diagram of an example implementation of a device 100 is shown in accordance with a preferred embodiment of the present invention. The device (or apparatus) 100 may implement a digital camera. In some embodiments, the device 100 may form a digital still camera. In other embodiments, the device 100 may form a digital video camera.

The device 100 may illustrate several features of the present invention. Overall, the features generally include, but are not limited to, uses of compressed correction models, uncompressed signal models, signal-dependent correction models, signal-independent correction models and temperature-dependent correction models. A camera implementing the present invention may incorporate one or more of the above features with or without one or more of the other features. For example, the device implementation shown in FIG. 2 generally uses compressed signal-dependent correction models. In another example, the device implementation shown in FIG. 5 may use uncompressed signal-dependent correction models.

The device 100 generally comprises a lens 102, a shutter 103, a circuit (or module) 104, a circuit (or module) 106, a circuit (or module) 108, a circuit (or module) 110 and a circuit (or module) 112. An optical signal (e.g., LIGHT) may be received by the circuit 104 through the lens 102 and the shutter 103. A signal (e.g., RAW PICTURE) may be presented from the circuit 104 to the circuit 106. Another signal (e.g., INDEX) may be presented from the circuit 110 to the circuit 112. The circuit 112 may present a signal (e.g., MODEL) to the circuit 106. A signal (e.g., CORRECTED PICTURE) may be presented from the circuit 106 to the circuit 108. The circuit 108 may present a signal (e.g., PROCESSED PICTURE).

The circuit 104 may implement an electro-optical sensor. The circuit 104 may comprise an array of pixels that are operational to convert the optical signal LIGHT into the electrical signal RAW PICTURE. The signal RAW PICTURE may comprise a digital signal containing a raw digital value for each of the pixels (e.g., 8 million pixels) of the circuit 104. The raw digital values may be proportional to the intensity of light striking the respective pixels.

The circuit 106 may implement a corrector (or correction) circuit. The circuit 106 may be operational to generate the signal CORRECTED PICTURE by adjusting the raw amplitude values in the signal RAW PICTURE using information received in the signal MODEL. The signal CORRECTED PICTURE may be a digital signal. The adjustments generally correct for fixed pixel noise and/or bad pixels. The signal CORRECTED PICTURE may have multiple corrected values, one for each of the raw digital pixel values.

The circuit 108 may implement one or more processing circuits. The circuit 108 may perform additional processing on the electronic images formed in the signal CORRECTED PICTURE. The processing may include, but is not limited to, gain for color corrections, offset adjustments for black-level calibrations, filtering, resizing and color space conversions. The signal PROCESSED PICTURE generally comprises a still image (e.g., JPEG) or a video bitstream (e.g., ITU-R BT.656-4) having a sequence of images (or pictures).

The circuit 110 generally implements a memory circuit. In some embodiments, the circuit 110 may be a dynamic random access memory circuit. In other embodiments, the circuit 110 may be a nonvolatile memory (e.g., FLASH memory) circuit. Operationally, the circuit 110 stores a map of the pixels in the circuit 104.

Each index of the map generally comprises a multi-bit (e.g., 4 bit) index value in a one-to-one relationship with the pixels. The index values may be presented in the signal INDEX to the circuit 112.

The circuit 112 may implement a decompression circuit. The circuit 112 is generally operational to decompress a compressed correction model received in the signal INDEX to recreate the fixed pattern noise model (e.g., a decompressed per-pixel correction model). The data of the decompressed fixed pattern noise model is generally presented to the circuit 106 in the signal MODEL. As such, the compressed information received from the circuit 110 may be smaller (e.g., fewer bits per pixel) than the decompressed information presented to and used in the circuit 106.

A first aspect of the present invention uses signal-dependent correction models to account for fixed pattern noise in the signal RAW PICTURE. A fixed pattern noise correction model may be applied to each pixel of the circuit 104. Differences between the corrected pixel values (e.g., CORRECTED) and the uncorrected pixel values (e.g., UNCORRECTED) are generally dependent on an amplitude of the uncorrected pixel value. The correction of each uncorrected pixel value may take a form of an offset and a gain. For example, for a particular pixel at row Y and column X in the picture, the corresponding corrected pixel value may be defined by equation 1 as follows:

$$\text{CORRECTED}(Y,X) = \text{UNCORRECTED}(Y,X) \times \text{GAIN}(Y,X) + \text{OFFSET}(Y,X) \quad \text{Eq.(1)}$$

A difference between the uncorrected pixel value and the corrected pixel value at the location Y,X is defined by equation 2 as follows:

$$\text{DIFFERENCE} = \text{UNCORRECTED}(Y,X) \times (\text{GAIN}(Y,X) - 1) + \text{OFFSET}(Y,X) \quad \text{Eq.(2)}$$

Where GAIN(Y,X) is not equal to 1, the difference between the uncorrected pixel value and corrected pixel value at the location Y,X generally depends on (e.g., varies as a function of) the uncorrected pixel value at location Y,X.

The use of both a gain and an offset applied to each pixel value generally improves the performance over existing methods (e.g., black frame subtraction). By using a more advanced correction method, the fixed pattern noise in the signal RAW PICTURE may be adjusted more accurately, leaving a corrected picture in the signal CORRECTED PICTURE with less residual fixed pattern noise, thereby improving the image quality.

Figure 3:
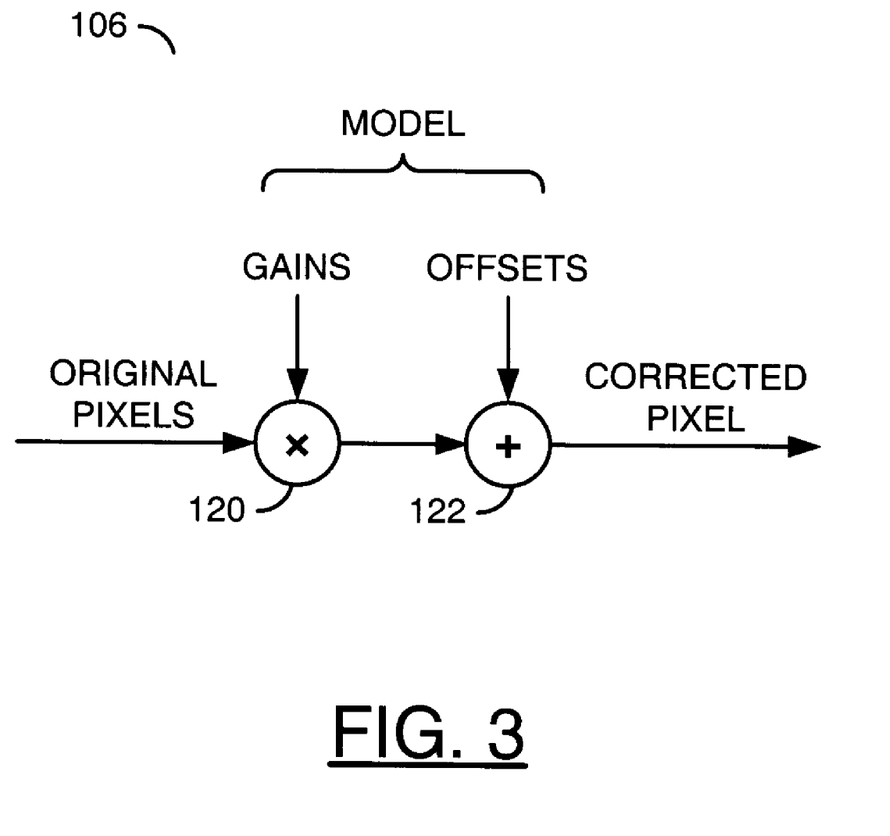
FIG. 3 is a detailed block diagram of an example implementation of a corrector circuit.

Referring to FIG. 3, a detailed block diagram of an example implementation of the circuit 106 is shown. The circuit 106 generally comprises a circuit (or module) 120 and a circuit (or module) 122. The signal MODEL may comprise a signal (e.g., GAINS) and a signal (e.g., OFFSETS). The circuits 120 and 122 may operate on each individual pixel value at each location Y,X as received in the signal RAW PICTURE. Operationally, the circuits 120 and 122 may implement the correction technique of equation 1 for all values of X and Y in each picture.

A second aspect of the present invention generally uses compression to reduce the size of the fixed pattern noise models. The fixed pattern noise models may be stored in the circuit 110, decompressed in the circuit 112, and then used to correct the picture in the circuit 106. The compression generally limits a number of possible combinations (e.g., 16) of gain value and offset value pairs.

Figure 4:
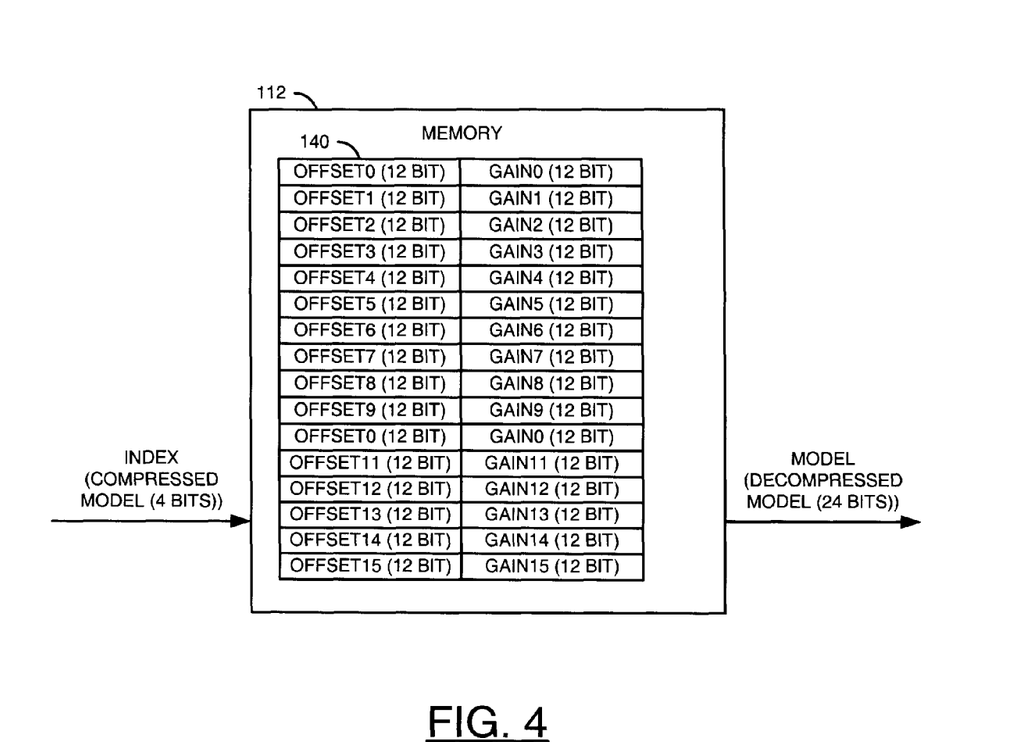
FIG. 4 is a diagram of an example decompression table.

Referring to FIG. 4, a diagram of an example decompression table 140 is shown. The table 140 may be stored in the circuit 112. A design of the table 140 generally implements the decompression function of the circuit 112. Other decompression designs may be implemented to meet the criteria of other applications.

The table 140 generally comprises an array of gain values and offset values addressed by an index value in the signal INDEX. The index value (e.g., address) may be represented as a small multi-bit (e.g., 4-bit) value. The gain values and the offset values may each be represented as large multi-bit (e.g., 12-bit) values.

A first compression embodiment may operate as follows. A fixed number of bits (e.g., B=4 bits) may be used to represent a model for each pixel. The table 140 may have $2^B$ entries to store multiple gain/offset pairs of the model. For example, for B=4 and using the gain/offset models described above, the table 140 may hold 16 pairs of gain values and offset values. The actual combination of gain values and offset values may use more bits than the B bits of the index value. For example, 12 bits may be stored for each of the gain values and each of the offset values. In the example, a 4-bit compressed version of the model may be decompressed into a 24 bit gain/offset model.

In a second compression embodiment, the fixed pattern noise models may be compressed jointly with per-pixel bad pixel information. For example, a table similar to the table 140 may be used to store both (i) compressed fixed pattern noise information and (ii) bad pixel information. Marking of the bad pixels may be accomplished using one or more of the following methods. In a first marking method, each bad pixel accounted for in the circuit 110 may be identified by a flag index value (e.g., 15 decimal) in the signal INDEX. The flag index value in the signal INDEX effectively bypasses the table 140 for the bad pixels by referencing a predetermined pair (e.g., OFFEST15, GAIN15) in the table 140. A second marking method may store a flag gain value (e.g., a maximum gain) and a flag offset value (e.g., a maximum offset value) in the table 140 for the bad pixels. Other marking methods may be implemented to meet the criteria of a particular application.

Using the compression/decompression aspect of the present invention generally reduces the amount of storage space consumed as well as the bandwidth used to load the model information from the circuit 110 to the circuit 106. For example, where 4 bits are used in the signal INDEX to represent 24-bit models in the signal MODEL, storage and bandwidth may be reduced by 87.5% compared with non-compressed techniques.

Figure 5:
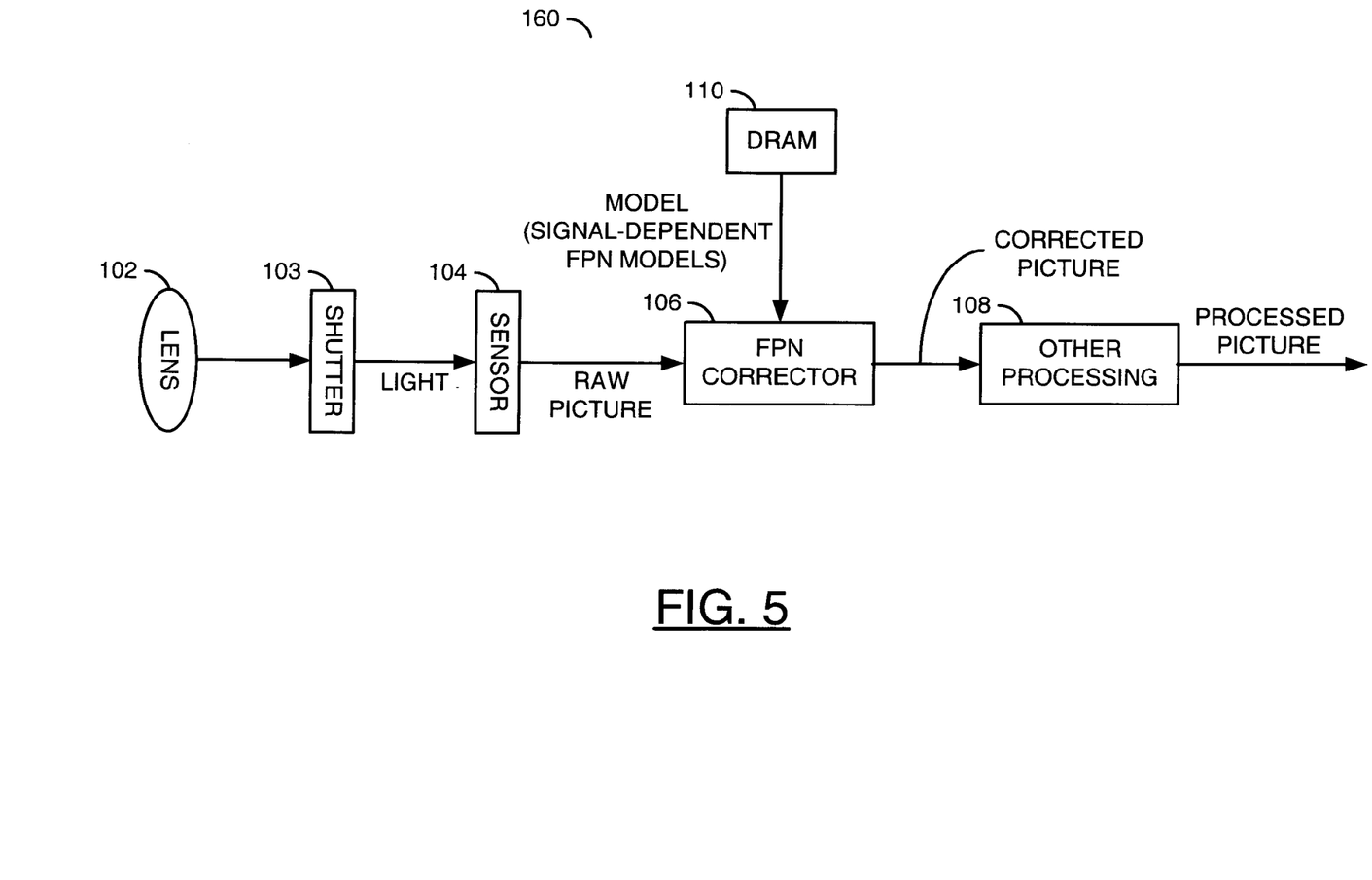
FIG. 5 is a block diagram of a second example implementation of the device.

Referring to FIG. 5, a block diagram of an example implementation of a device 160 is shown. The device (or apparatus) 160 may be a variation of the device 100 shown in FIG. 2. Removing fixed pattern noise may be improved by using a signal-dependent fixed pattern noise removal technique. In a signal-dependent technique, the value of the pixel to be corrected may be used to determine the change in the value of the pixel as corrected.

The device 160 generally comprises the lens 102, a shutter 103, the circuit (or module) 104, the circuit (or module) 106, the circuit (or module) 108 and the circuit (or module) 110. A difference between the device 160 and the device 100 may be that the circuit 110 presents the signal MODEL directly to the circuit 106. Another difference may be that the circuit 110 in the device 160 may contain signal-dependent information for each pixel of the circuit 104, instead of an index value.

Sometimes a particular pixel is so "bad" that the particular pixel may not be properly corrected using information about the fixed pattern noise. Such "bad pixels" may be corrected by interpolating the value at the bad pixel location from neighboring pixels. In correcting a bad pixel (unlike fixed pattern noise correction) the actual bad pixel value in the signal RAW PICTURE may be completely ignored and a new pixel value in the signal CORRECTED PICTURE is generally estimated using neighboring pixel values.

A bad pixel mask (e.g., a per-pixel correction model) may be used to identify the locations of the bad pixels. The bad pixel mask generally comprises a validity value for each pixel on the circuit 104 indicating if the respective pixel is bad or good. The bad pixel mask may also be stored in the circuit 110 and conveyed in the signal MODEL. The circuit 106 may respond to a bad pixel indication by generated a new pixel value in the signal CORRECTED PICTURE that completely replaces the original pixel value received in the signal RAW PICTURE.

Both the fixed pattern noise model and the bad pixel mask may be black-level calibrated for a particular circuit 104. Black-level calibration may be achieved by taking a picture with the shutter 103 closed (e.g., black frame) at one or more times. A first time may be when the device 160 is powered on before a picture or video is taken. A second time may be just after a real picture is taken. A third time may be shortly after the device 160 has been commanded to power off but before the electronics actually lose power. Black-level calibration information extracted from the resulting black frame may be stored in the circuit 110 for later use.

The temperature at which a sensor is fixed pattern noise calibrated and the temperature at which the fixed pattern noise calibration is used generally effect an accuracy of the fixed pattern noise correction. In a first temperature calibration technique, the circuit 104 may be temperature calibrated when the camera is first powered on. The resulting information may be stored and then used until a next temperature calibration time. In a second temperature calibration technique, the calibration may be performed at a time close to the corresponding correction and so may be very accurate. For example, the circuit 104 may be calibrated just after a still picture has been taken and the temperature calibration information subsequently used to correct the just-taken picture. A difference in the sensor temperature between the calibration time and the use time may have a material impact on the accuracy of the fixed pattern noise correction and/or the bad pixel correction.

Fixed pattern noise corrections and/or bad pixel corrections may be improved by using a temperature-dependent noise removal technique. In a temperature-dependent noise removal technique, a temperature of the circuit 104 may be used to determine a change in the values of the pixels. As the temperature of the circuit 104 changes, the applied corrections may be adjusted accordingly.

Figure 6:
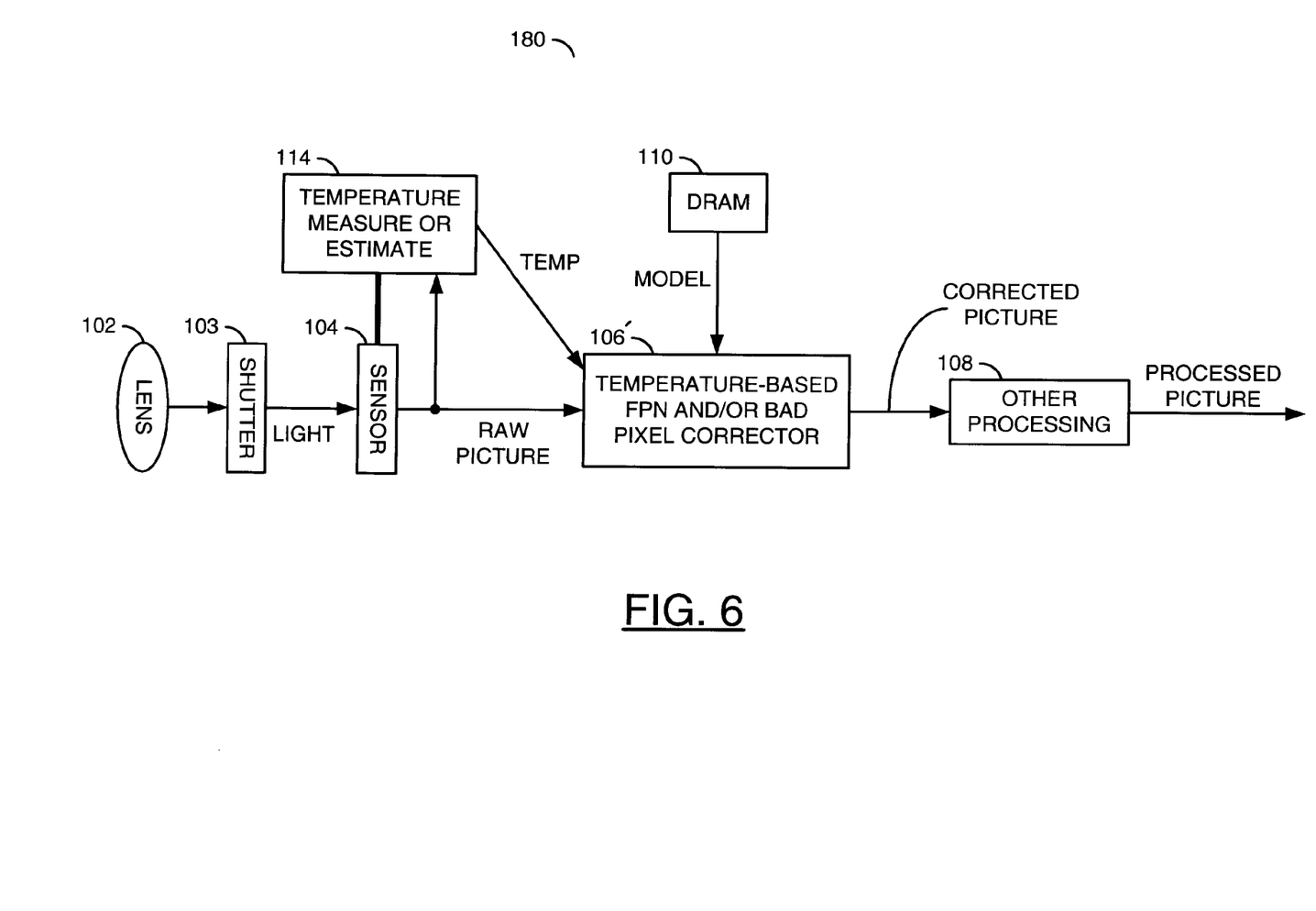
FIG. 6 is a block diagram of a third example implementation of the device.

Referring to FIG. 6, a block diagram of an example implementation of a device 180 is shown. The device 180 may be a variation of the device 100 and/or the device 160. In a third aspect of the present invention, an operating temperature of the circuit 104 may be measured or estimated. The fixed pattern noise and/or bad pixels may be corrected based on the measured temperature or the estimated temperature.

The device 180 generally comprises the lens 102, the shutter 103, the circuit (or module) 104, a circuit (or module) 106', the circuit (or module) 108, the circuit (or module) 110 and a circuit (or module) 114. A signal (e.g., TEMP) may be presented from the circuit 114 to the circuit 106'. The signal MODEL may be presented from the circuit 110 directly to the module 106'. The circuit 106' may implement a temperature-dependent version of the circuit 106.

In a first temperature-dependent embodiment, the circuit 114 may implement a thermometer or other temperature sensor disposed in, on or near the circuit 104. As such, the circuit 114 generally provides a direct temperature measurement or a proximate temperature measurement of the circuit 104. The better the thermal contact between the circuit 114 and the circuit 104, the more accurate the measurement. Based on the temperature value received in the signal TEMP, the circuit 106' may adjust the corrections applied the raw pixel values based on the actual measured temperature value.

Figure 7:
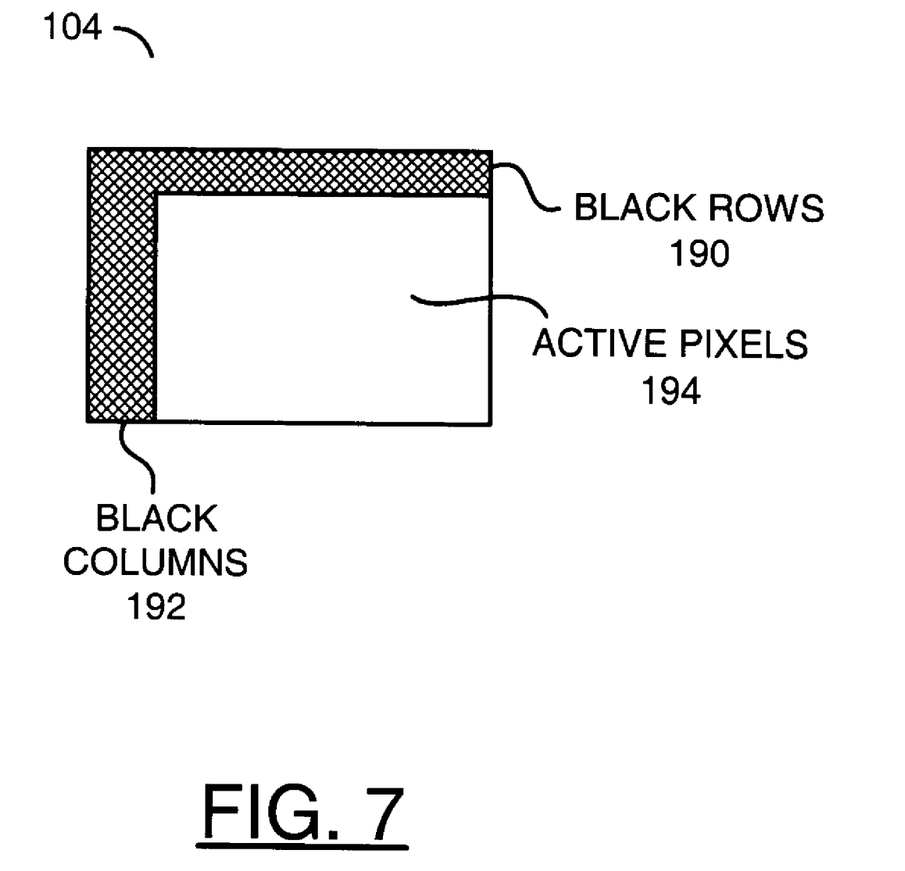
FIG. 7 is a diagram of an example sensor circuit.

Referring to FIG. 7, a diagram of an example circuit 104 is shown. In a second temperature-dependent embodiment, the temperature may be estimated by the circuit 114 based on the measurements taken from digital pixels captured by the circuit 104. The circuit 104 generally has one or more black rows 190, one or more black columns 192 and an area of active pixels 194. The black rows 190 and the black columns 192 may be positioned and/or covered to avoid the light when the shutter 103 is opened. In some embodiments, a comparison of some or all of the "black" pixel values read from the black rows 190 and/or the black columns 192 with a known threshold value (e.g., leakage current of a black pixel at a known temperature) may be used to estimate the temperature of the circuit 104. In other embodiments, a variation among some or all of the black pixels values may be used to calculate an estimated temperature of the circuit 104. For example, the variation may be calculated as an average of some to all of the uncorrected black pixels or a variance of some to all of the black pixels. The variance is generally an average of the square of a difference between each of the black pixel values and an average black pixel value. Once the temperature of the circuit 104 has been estimated, the circuit 106' may adjust the corrections applied to the raw pixel data based on the estimated temperature value.

Figure 8:
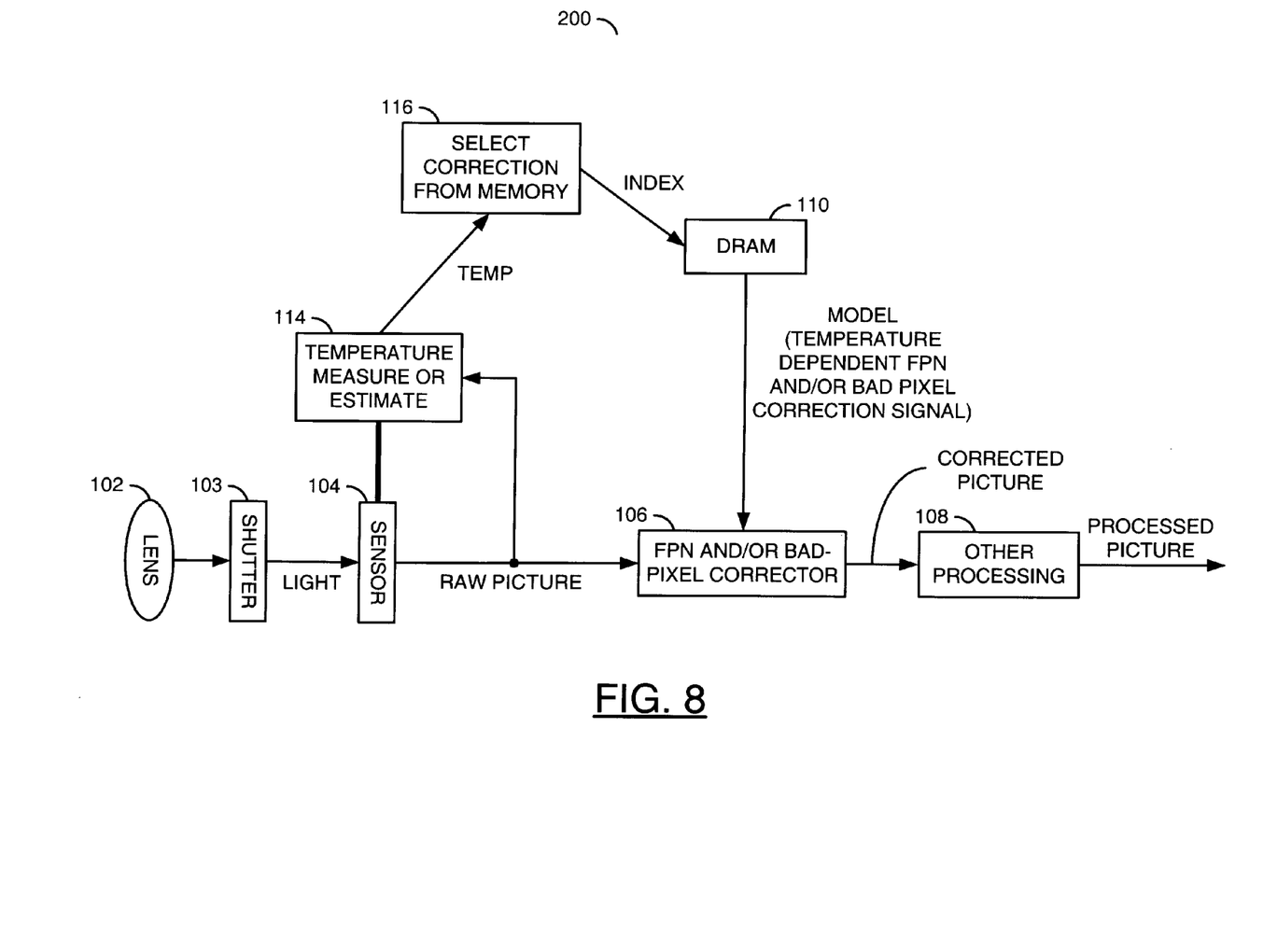
FIG. 8 is a block diagram of a fourth example implementation of the device.

Referring to FIG. 8, a block diagram of an example implementation of a device 200 is shown. The device (or apparatus) 200 may be a variation of the devices 100, 160 and/or 180. The device 200 generally comprises the lens 102, the shutter 103, the circuit (or module) 104, the circuit (or module) 106, the circuit (or module) 108, the circuit (or module) 110, the circuit (or module) 114 and a circuit (or module) 116. The circuit 114 may generate and present the signal TEMP to the circuit 116. The circuit 116 may generate and present the signal INDEX to the circuit 110. The device 200 may use the temperature information to adjust the fixed pattern noise correction and/or bad pixel mask models.

The circuit 116 may implement a selection circuit. The circuit 116 may be operational to generate an index value (e.g., an address) in the signal INDEX to select an appropriate offset value and gain value pair and/or bad pixel mask from the circuit 110 based on the temperature received in the signal TEMP.

In a first temperature/model-based embodiment, once a temperature of the circuit 104 has been determined by the circuit 114 and a corresponding index value for the temperature has been determined by the circuit 116, different bad pixel masks and/or fixed pattern noise models may be read from the circuit 110 for use in correcting the raw pixels in the circuit 106. The fixed pattern noise model and/or bad pixel mask that is applied by the circuit 106 may thus be based on the temperature of the circuit 104.

Figure 9:
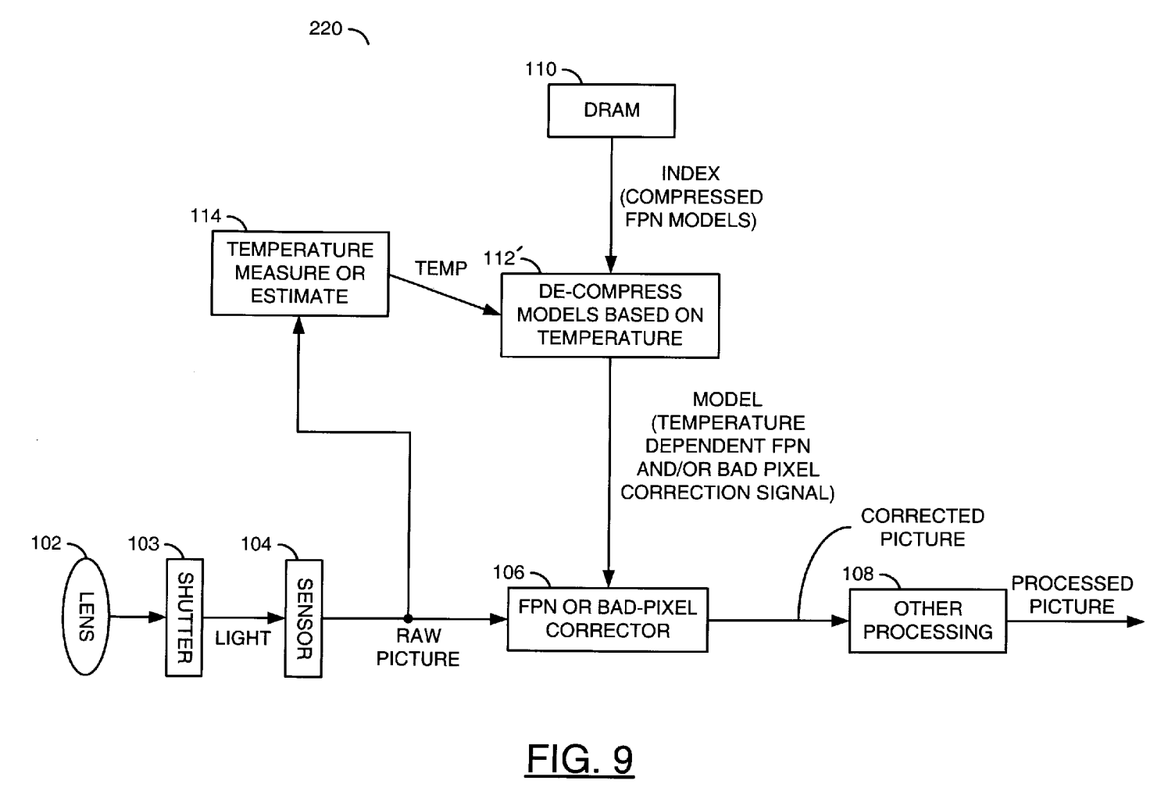
FIG. 9 is a block diagram of a fifth example implementation of the device.

Referring to FIG. 9, a block diagram of an example implementation of a device 220 is shown. The device (or apparatus) 220 may be a variation of the devices 100, 160, 180 and/or 200. The device 220 generally comprises the lens 102, the shutter 103, the circuit (or module) 104, the circuit (or module) 106, the circuit (or module) 108, the circuit (or module) 110, a circuit (or module) 112' and the circuit (or module) 114. The signal TEMP may be presented from the circuit 114 directly to the circuit 112'.

The circuit 112' may implement a temperature-dependent decompression circuit. The circuit 112' may be a variation of the circuit 112. Operationally, the circuit 112' may generate and present the signal MODEL based on both of the index value received from the circuit 110 in the signal INDEX and the temperature value received from the circuit 114 via the signal TEMP.

In a second temperature/model-based embodiment, fixed pattern noise information and/or bad pixel information may be stored in circuit 110 in a compressed form as described above. For different temperatures, the same compressed version of the fixed pattern noise/bad pixel model may be presented from the circuit 110 to the circuit 112' for the current raw pixel being corrected. The circuit 112' may then apply different decompression methods to the fixe pattern noise/bad pixel model based on the temperature value. For example, the compressed models may be decompressed by looking up indices from a lookup table for an appropriate correction model. The indices stored in the lookup table are generally programmed differently for each temperature value. The resulting temperature-dependent model may be transferred to the circuit 106 in the signal MODEL. The circuit 106 may use the model to correct/fix the current raw pixel.

The first temperature/model-based embodiment generally provides more flexible temperature dependent correction than the second temperature/model-based embodiment, since fully independent correction models may be used for each temperature. The first temperature/model-based embodiment may be appropriate for high accuracy applications. The second temperature/model-based embodiment generally uses much less storage than the first temperature/model-based embodiment, since the fixed pattern noise compressed fixed pattern noise models may use much memory than the lookup tables. Therefore, the second temperature/model-based embodiment may be more suitable for cost sensitive applications.

In a third temperature/model-based embodiment (i) multiple sets of models may be used based on the temperature values and (ii) the decompression method may also be based on the temperature values. For example, fully independent fixed pattern noise/bad pixel models may be stored for 50 degrees Celsius, 60 degrees Celsius, 70 degrees Celsius, 80 degrees Celsius and 90 degrees Celsius. For a current temperature, a particular fixed pattern noise/bad pixel model corresponding to the temperature closest to the current temperature may be used. Furthermore, the decompression method used for the particular fixed pattern noise/bad pixel model may also be modified based on the current temperature. Other temperature ranges and/or temperature step sizes may be implemented to meet the criteria of a particular application.

The device 220 may be configured to self-calibrate at different temperatures. In a fourth aspect of the invention, the per-pixel correction model corresponding to the circuit 104 may be temperature calibrated at each black-level calibration time. In a first temperature calibration embodiment, the temperature calibration may be performed when a command is received to power down the camera. A variety of temperatures would be expected when the camera is turned off (based on environmental temperature and duration of camera operation) and thus a variety of calibration points may be established and adjusted over time. In a second temperature calibration embodiment, the temperature calibration may be performed both (i) shortly after the camera is powered up and (ii) after the camera has been commanded to power down.

Figure 10:
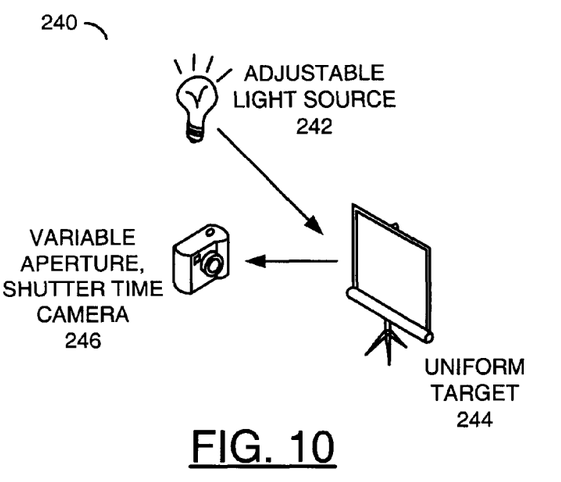
FIG. 10 is a diagram of an example illumination-dependent calibration arrangement.

Referring to FIG. 10, a diagram of an example illumination-dependent calibration arrangement 240 is shown. The arrangement 240 generally comprises a light source 242, a target 244 and a device 246. The device 246 may represent any one or more of the devices 100, 160, 180, 200 and/or 220. The light source 242 and the target 244 may be physically external to the device 246. As such, the device 246 may be calibrated in a factory prior to sale, or by the user after the sale.

The noise present in the raw pixel values may also be dependent on the illumination level incident on the respective pixel elements. In a fifth aspect of the present invention, the sensor response of the device 246 (e.g., the circuit 104) may be measured at different illumination levels. The substantially uniform target 244 may be illuminated by the light source 242 and calibration frames may be captured by the device 246. One or more methods may be used to vary the amount of light reaching the circuit 104 withing the device 246. First, an intensity of the light source 242 may be adjusted to change the strength of the light incident on the pixels of the circuit 104. Second, an aperture of the device 246 may be used to adjust the amount of light reaching the circuit 104. Third, a shutter time of the shutter 103 may be changed to vary the amount of light reaching the circuit 104.

For an illumination-based calibration, the target 244 may be illuminated at a number N (e.g., N≧2) of levels and calibration information recorded inside the device 246 at each illumination level. As such, the fixed pattern noise corresponding to the circuit 104 may be modeled as a function of the signal level.

Figure 11:
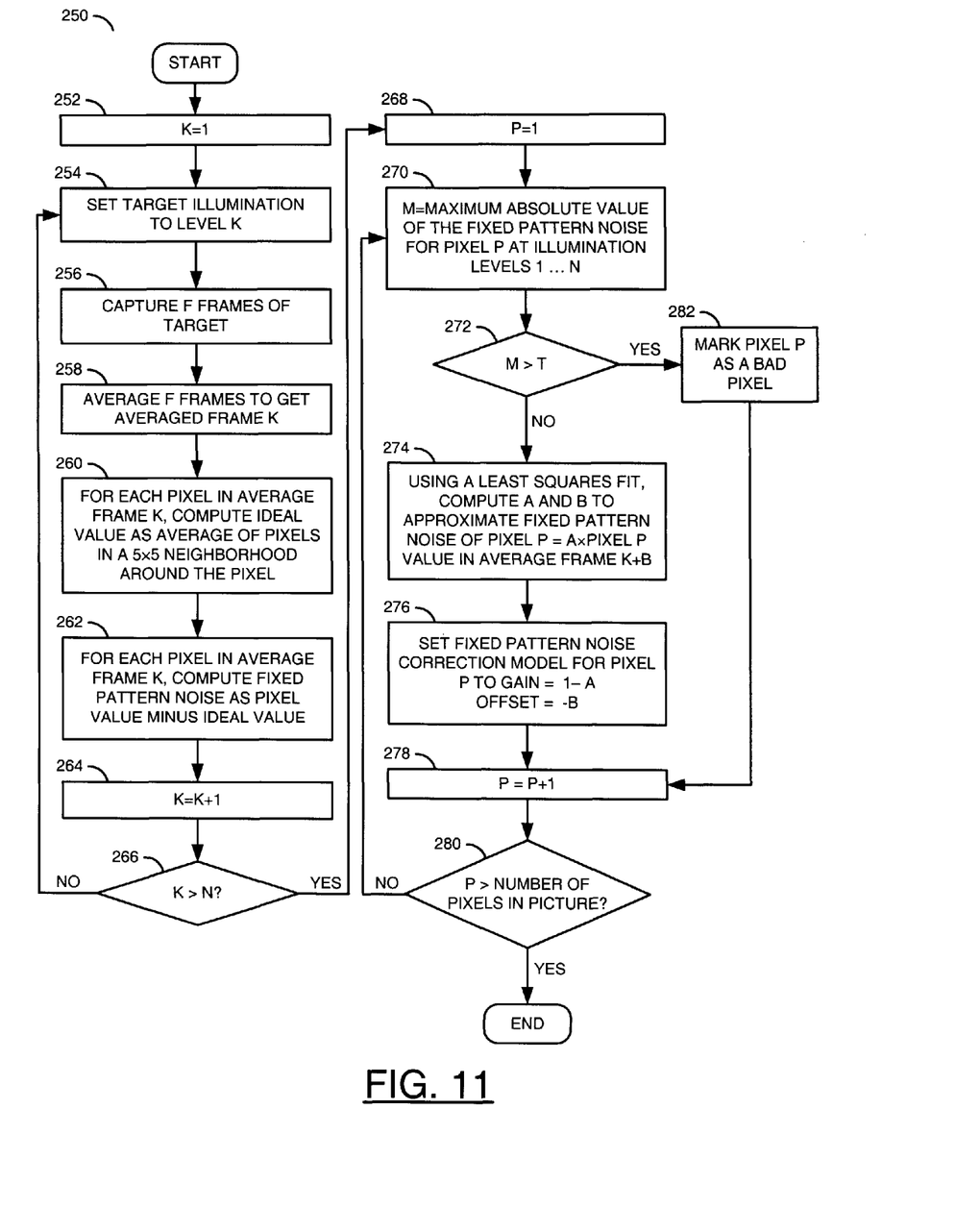
FIG. 11 is a flow diagram of an example method of illumination-based calibration.

Referring to FIG. 11, a flow diagram of an example method 250 of illumination-based calibration is shown. The method (or process) 250 may be implemented totally inside the device 246. The method 250 generally comprises a step (or block) 252, a step (or block) 254, a step (or block) 256, a step (or block) 258, a step (or block) 260, a step (or block) 262, a step (or block) 264, a step (or block) 266, a step (or block) 268, a step (or block) 270, a step (or block) 272, a step (or block) 274, a step (or block) 276, a step (or block) 278, a step (or block) 280 and a step (or block) 282.

In the step 252, a level counter (e.g., K) may be initialized to a starting value (e.g., K=1). The target illumination level may be set to an associated value for the level counter K in the step 254. At each of the N illumination levels, a number of frames (e.g., F) may be captured in the step 256. The F frames may be averaged to make an average frame in the step 258. The averaging may be performed because the average frame generally has much less non-fixed noise than the individually captured frames.

For each pixel at each of the N illumination levels, an ideal value may be computed in the step 260 by combining several adjacent pixels. For example, a group (e.g., 5×5) of pixels neighboring a current pixel may be averaged to calculate the ideal value for the current pixel. The fixed pattern noise for each pixel may be calculated as the value of the pixel in the average frame minus the ideal value and then stored in a memory in the step 262.

In the step 264, the counter K may be incremented to indicate a new illumination level. A check of the level counter K compared with the N illumination levels may be performed in the step 266. If the level counter K has not exceeded the top illumination level (e.g., the NO branch of step 262), the method 250 may return to the step 258 and illuminate the target at the next level. If all of the N illumination levels have been captured (e.g., the YES branch of step 262), the method 250 may continue with the step 268.

The above steps result in N arrays of fixed pattern noise values at the N different illumination levels. The N fixed pattern noise values for each pixel of the circuit 104 may then be checked to (i) identify bad pixels and (ii) create fixed pattern noise models for the pixels. In the step 268, a pixel counter (e.g., P) may be set to a starting value (e.g., P=1). A maximum value (e.g., M) among the N fixed pattern noise values of the current pixel may be identified in the step 270.

In the step 272, the maximum value M of the current pixel may be compared against a threshold value (e.g., T). If the maximum value M is not above the threshold value T (e.g., the NO branch of step 272), the current pixel may be considered to be a good pixel. In the step 276, a fitting technique (e.g., a least square fit routine) may be applied using the N fixed pattern noise values of the current pixel. Parameters (e.g., A and B) may be calculated by the fitting technique in the step 274 to approximate N fixed pattern noise values of the current pixel at the N illumination levels. The fixed pattern noise approximation of the current pixel as a function of the level counter K (e.g., illumination level) may be expressed by equation 3 as follows:

$$\text{Noise}(K) = A \times \text{Pixel Value in average frame}(K) + B \quad \text{Eq.(3)}$$

The parameter A and the parameter B may then be converted into a fixed pattern noise correction model of gain and offset in the step 276. The gain value and the offset value may be defined by equations 4 and 5 as follows:

$$\text{Gain} = 1 - A \quad \text{Eq.(4)}$$

$$\text{Offset} = -B \quad \text{Eq.(5)}$$

The gain value and the offset value may be stored in the table 140 for subsequent use by the circuit 106 to correct for fixed pattern noise.

Returning to step 272, if the maximum value M of the current pixel exceeds the threshold value T (e.g., the YES branch of step 272), the current pixel may be marked as a bad pixel in the step 282. Marking of the current pixel may be performed by any of the techniques described earlier. After either (i) the parameters of the current pixel have been stored or (ii) the current pixel has been marked as a bad pixel, the current pixel counter P may be incremented to the next pixel in the step 278. If the current pixel is not the last pixel (e.g., the NO branch of step 280), the method 250 may continue with the step 270 to model the next pixel. After the last pixel has been modeled and the corresponding gain value and the offset value stored in the circuit 110 (e.g., the YES) branch of step 280, the method may be ended.

Figure 12:
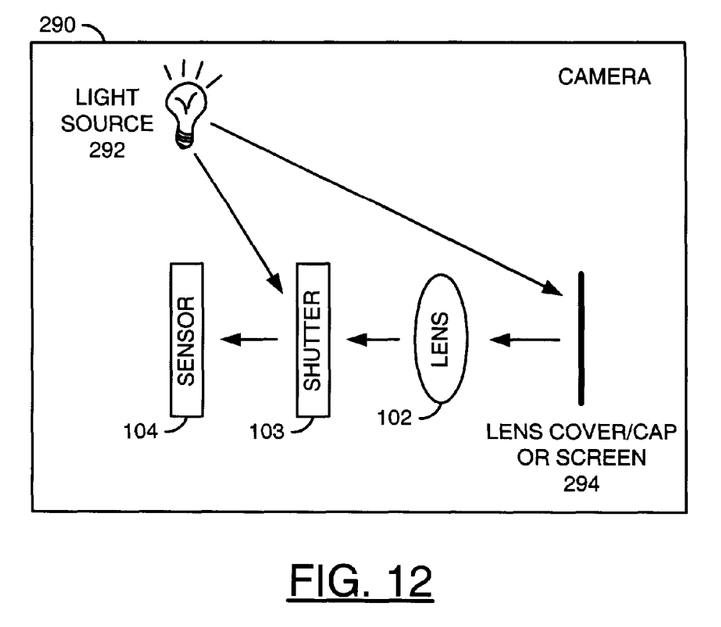
FIG. 12 is a diagram of a sixth example implementation of the device.

Referring to FIG. 12, a diagram of an example implementation of a fifth device 290 is shown. The device 290 generally comprises the lens 102, the shutter 103, the circuit (or module) 104, a light source 292 and a target 294. The device 290 may be a variation of any one or more of the devices 100, 160, 180, 200, 220 and/or 246.

The light source 292 may be physically located inside a housing of the device 292. The light source may be embodied as a light emitting diode (LED). The substantially uniform target 294 may be a back side (e.g., inward facing side) of (i) an automatic lens cover or (ii) a manual lens cap. In some embodiments, the light source 292 may illuminate a back side of the shutter 103. Where the target is a manual lens cap, a presence of the lens cap in front of the lens 102 may be determined by either a switch or by comparing the pixel data against a low-amplitude threshold.

In an illumination-based calibration, the fixed pattern noise and/or the bad pixels may be calibrated when device 290 is commanded to power down. When the user commands the device 290 off, the device 290 may automatically calibrate itself and then actually shut down. As such, the user generally does not even know that the device 290 is calibrating. The device 290 may appear to be "off" even though the illumination-based calibration is occurring. In some embodiments, the device 290 may black-level calibrate by capturing black frames.

Calibrating when the device 290 is commanded to power down may have the following benefits. For example, startup time is not lengthened by the calibration. Furthermore, the circuit 104 may be calibrated at a variety of temperatures, based on the sensor temperatures when the device 290 is powered down at different times. Therefore, the fixed pattern noise and the bad pixel corrections may use the appropriate calibration information based on the sensor temperature.

The function performed by the diagrams of FIGS. 2-12 may be implemented using a conventional general purpose digital computer programmed according to the teachings of the present specification, as will be apparent to those skilled in the relevant art(s). Appropriate software coding can readily be prepared by skilled programmers based on the teachings of the present disclosure, as will also be apparent to those skilled in the relevant art(s).

The present invention may also be implemented by the preparation of ASICs, FPGAs, or by interconnecting an appropriate network of conventional component circuits, as is described herein, modifications of which will be readily apparent to those skilled in the art(s).

The present invention thus may also include a computer product which may be a storage medium including instructions which can be used to program a computer to perform a process in accordance with the present invention. The storage medium can include, but is not limited to, any type of disk including floppy disk, optical disk, CD-ROM, magneto-optical disks, ROMs, RAMs, EPROMs, EEPROMs, Flash memory, magnetic or optical cards, or any type of media suitable for storing electronic instructions.

While the invention has been particularly shown and described with reference to the preferred embodiments thereof, it will be understood by those skilled in the art that various changes in form and details may be made without departing from the spirit and scope of the invention.

The invention claimed is:

1. A method for correcting pixel values of a plurality of pixels, comprising the steps of:
   (A) generating said pixel values from a sensor in response to an optical signal;
   (B) generating a plurality of corrected values by applying a per-pixel correction model to said pixel values, wherein (i) said per-pixel correction model comprises a plurality of gain values and a plurality of offset values, (ii) said per-pixel correction model includes a plurality of bad pixel flags that together indicate at least one bad pixel of said pixels, (iii) at least one of said bad pixel flags is a predetermined one of said gain values and (iv) at least one of said bad pixel flags is a predetermined one of said offset values;
   (C) comparing for each of said pixels both (i) a corresponding one of said gain values with said predetermined gain value and (ii) a corresponding one of said offset values with said predetermined offset value; and
   (D) replacing at least one bad pixel value with a new pixel value where said comparing concludes that said corresponding gain value matches said predetermined gain value and said corresponding offset value matches said predetermined offset value, wherein said new pixel value is determined independently of said corresponding gain value and independently of said corresponding offset value.

2. The method according to claim 1, wherein said per-pixel correction model comprises a fixed pattern noise correction model that compensates for a fixed pattern noise in said sensor.

3. The method according to claim 1, further comprising the step of:
   generating a model signal carrying said gain values and said offset values by reading from a compressed model using a plurality of index values as a plurality of addresses, wherein (i) said index values are fewer in number than said pixels and (ii) said model signal is used to correct said pixel values.

4. The method according to claim 3, wherein said gain values and said offset value in said model signal depend on a temperature of said sensor.

5. A device comprising:
   a sensor configured to generate a plurality of pixel values of a plurality of pixels in response to an optical signal; and
   a corrector circuit configured to (i) generate a plurality of corrected values by applying a per-pixel correction model to said pixel values, wherein (a) said per-pixel correction model comprises a plurality of gain values and a plurality of offset values, (b) said per-pixel correction model includes a plurality of bad pixel flags that together indicate at least one bad pixel of said pixels, (c) at least one of said bad pixel flags is a predetermined one of said gain values and (d) at least one of said bad pixel flags is a predetermined one of said offset values, (ii) compare for each of said pixels both (a) a corresponding one of said gain values with said predetermined gain value and (b) a corresponding one of said offset values with said predetermined offset value and (iii) replace at least one bad pixel value with a new pixel value where said compare concludes that said corresponding gain value matches said predetermined gain value and said corresponding offset value matches said predetermined offset value, wherein (a) said new pixel value is determined independently of said corresponding gain value and independently of said corresponding offset value.

6. The device according to claim 5, further comprising a decompression circuit configured to generate a model signal carrying said gain values and said offset values by reading from a compressed model using a plurality of index values as a plurality, of addresses, wherein (i) said index values are fewer in number than said pixels and (ii) said model signal is used to correct said pixel values.

7. The device according to claim 6, wherein said decompression circuit is configured to store said on compressed model in a lookup table that is addressed by said index values.

8. The device according to claim 5, wherein said sensor and said corrector circuit form a digital still camera.

9. A method for correcting pixel values of a plurality of pixels, comprising the steps of:
   (A) generating said pixel values from a sensor in response to an optical signal;
   (B) generating a per-pixel correction model by decompressing a compressed model, wherein (i) said compressed model includes a plurality of bad pixel flags that together indicate at least one bad pixel of said pixels, (ii) at least one of said bad pixel flags is a predetermined one of a plurality of gain values in said compressed model and (iii) at least one of said bad pixel flags is a predetermined one of a plurality of offset values in said compressed model;
   (C) generating a plurality of corrected values by applying said per-pixel correction model to said pixel values;
   (D) comparing for each of said pixels both (i) a corresponding one of said gain values with said predetermined gain value and (ii) a corresponding one of said offset values with said predetermined offset value; and (E) replacing at least one bad pixel value with a new pixel value where said comparing concludes that said corresponding gain value matches said predetermined gain value and said corresponding offset value matches said predetermined offset value, wherein said new pixel value is determined independently of said corresponding gain value and said corresponding offset value.

10. The method according to claim 9, wherein step (B) comprises the sub-step of:
generating an index signal based on said compressed model, wherein (i) said index signal carries a plurality of index values that address said compressed model, (ii) a current one of said index values corresponds to a current one of said pixels being corrected and (iii) said index values are fewer in number than said pixels.

11. The method according to claim 10, wherein step (B) further comprises the sub-step of:
reading a current one of said gain values and a current one of said offset values corresponding to said current pixel from one of a plurality of lines in said compressed model using said current index value as an address.

12. The method according to claim 11, further comprising the step of:
reading a from a second memory to generate said current index value in said index signal, wherein said map associates each of said pixels with a single one of said index values.

13. The method according to claim 9, wherein (i) said compressed model comprises a plurality of lines addressed by a plurality of index values, (ii) each of said lines stores one of said gain values and one of said offset values and (iii) at least one of said lines stores at least two of said bad pixel flags.

14. A device comprising:
a sensor configured to generate a plurality of pixel values of a plurality of pixels in response to an optical signal;
a decompression circuit configured to generate a per-pixel correction model by decompressing a compressed model; and
a corrector circuit configured to (i) generate a plurality of corrected values by applying said per-pixel correction model to said pixel values, wherein said compressed model includes (a) a plurality of bad pixel flags that together indicate at least one bad pixel of said pixels, (b) at least one of said bad pixel flags is a predetermined one of a plurality of gain values in said compressed model and (c) at least one of said bad pixel flags is a predetermined one of a plurality of offset values in said compressed model, (ii) compare for each of said pixels both (a) a corresponding one of said gain values with said predetermined gain value and (b) a corresponding one of said offset values with said predetermined offset value and (iii) replace at least one bad pixel value with a new pixel value where said compare concludes that said corresponding gain value matches said predetermined gain value and said corresponding offset value matches said predetermined offset value, wherein said new pixel value is determined independently of said corresponding gain value and said corresponding offset value.

15. The device according to claim 14, further comprising a memory configured to generate an index signal based on said compressed model, wherein (i) said index signal carries a plurality of index values that address said compressed model, (ii) a current one of said index values corresponds to a current one of said pixels being corrected and (iii) said index values are fewer in number than said pixels.

16. The device according to claim 14, wherein said per-pixel correction model corresponding to at least one of said corrected values depends on an amplitude of a respective at least one of said pixel values.

17. The method according to claim 3, further comprising the step of:
generating an index signal carrying said index values in response to reading a map that associates each of said pixels with a single one of said index values.

18. The method according to claim 3, wherein said compressed model comprises (i) a plurality of lines addressed by said index values, (ii) each of said lines stores one of said gain values and one of said offset values and (iii) at least one of said lines stores at least two of said bad pixel flags.

19. The device according to claim 6, further comprising a memory configured to (i) store a map that associates each of said pixels with a single one of said index values and (ii) generate an index signal carrying said index values in response to reading said map.

20. The device according to claim 6, wherein said compressed model comprises (i) a plurality of lines addressed by said index values, (ii) each of said lines stores one of said gain values and one of said offset values and (iii) at least one of said lines stores at least two of said bad pixel flags.

21. The device according to claim 15, wherein said decompression circuit configured to (i) store said compressed model in a lookup table and (ii) read a current one of said gain values and a current one of said offset values corresponding to said current pixel from one of a plurality of lines in said compressed model using said current index value as an address.

* * * * *